United States Patent
Dutta et al.

(10) Patent No.: US 8,402,013 B2
(45) Date of Patent: Mar. 19, 2013

(54) RICH SITE MAPS

(75) Inventors: Suhail Dutta, Seattle, WA (US); Jing Fan, Redmond, WA (US); Arun Mathew Abraham, Redmond, WA (US); Allen Wayne Denver, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 12/823,540

(22) Filed: Jun. 25, 2010

(65) Prior Publication Data

US 2011/0320426 A1    Dec. 29, 2011

(51) Int. Cl.
  G06F 7/00      (2006.01)
  G06F 17/30     (2006.01)
(52) U.S. Cl. ........................................ 707/709; 707/726
(58) Field of Classification Search .......................... None
  See application file for complete search history.

(56) References Cited

U.S. PATENT DOCUMENTS

| | | | |
|---|---|---|---|
| 6,144,962 A | 11/2000 | Weinberg | |
| 6,405,238 B1 | 6/2002 | Votipka | |
| 7,409,634 B2 | 8/2008 | Davis | |
| 8,132,095 B2 * | 3/2012 | Seolas et al. | 715/234 |
| 2002/0147805 A1 * | 10/2002 | Leshem et al. | 709/223 |
| 2008/0147644 A1 * | 6/2008 | Aridor et al. | 707/5 |
| 2008/0183720 A1 | 7/2008 | Brown | |
| 2009/0204638 A1 | 8/2009 | Hollier | |
| 2009/0254834 A1 * | 10/2009 | Wald | 715/738 |
| 2009/0327237 A1 * | 12/2009 | Zhang et al. | 707/3 |

OTHER PUBLICATIONS

What are Sitemaps?, http://www.sitemaps.org/, 1 Page, Published Feb. 27, 2008.
ASP.NET Site Navigation, MSDN, http://msdn.microsoft.com/en-us/library/e468hxky(printer).aspx, 6 Pages, Retrieved Apr. 15, 2010.

* cited by examiner

*Primary Examiner* — Jay Morrison
(74) *Attorney, Agent, or Firm* — Workman Nydegger

(57) ABSTRACT

Providing a website map to a user. A method includes gathering information about web pages in a website, including information related to web page relationships, controls, and executable code underlying one or more web pages in the website. A relationship map is created. The relationship map includes representations of relationships between the web pages, the controls and the executable code underlying one or more web pages in the website. The method further includes graphically displaying at least a portion of the relationship map in a graphical user interface at the computing system.

20 Claims, 4 Drawing Sheets

RICH SITE MAPS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Computer interconnections allow computers to access websites on various computer systems. A website typically comprises a number of different web pages. The functionality of web pages can be enhanced by user controls within the web page and executable code underlying the web page that allows the web page to provide customized or enhanced functionality.

A map of a website can be a powerful tool in understanding how the pages and controls interact with each other. In most cases, such maps are built by hand or possibly by a tool analyzing the html links between the pages. However, this solution has several drawbacks. First, the maps do not show the dependencies to the code underlying the web pages. For example, the map may not show a navigable link between a page with a button on it and the handler in code that handles the button being invoked. Second, the maps lack representations of dependencies between web pages and lower level dependencies such as data access etc. Third, a lot of navigation between pages is handled by framework configuration files and cannot be guessed by just looking at pages. The lack of this complete dependency information leads to an incomplete (or possibly incorrect) analysis of the impact of various changes to parts of the system which leads to increased cost of software development. Similar problems may exist for other types of applications including navigable graphical user interfaces.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method practiced in a computing environment. The method includes acts for providing a website map or application map to a user. The method includes gathering information about web pages in a website, including information related to web page relationships, controls, and executable code underlying one or more web pages in the website. A relationship map is created. The relationship map includes representations of relationships between the web pages, the controls and the executable code underlying one or more web pages in the website. The method further includes graphically displaying at least a portion of the relationship map in a graphical user interface at the computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may implement website mapping that facilitates an understanding of a website (or application) space merged with an understanding of code space to produce a rich site map that can help in providing accurate impact analysis so that users can quickly determine the impact of changing elements of an application or website. For example, using the site maps of some embodiments, developers may be able to answer questions related to determining what business logic and data access code is related to a particular page. As another example, developers may be able to determine what pages will be affected by a change, such as for example, changes related to caching. Various other scenarios can be imagined.

Thus, in one embodiment, a site map may include information on all the pages in a site and links between the pages in the site. These links can be direct dependencies (e.g. links between pages and controls in the pages); navigation links (e.g. links from page to page), etc. This kind of information can provide a quick overview of a website and how a user's experience flows through it. Additionally, information in the website map can be used to tie pages and navigations to the rest of the system.

Illustratively, while in a web layer, a user can see a particular page and all the pages it uses. The user can further see that the page has a particular control (e.g. a submit order button). Using one embodiment, a user can see what business logic code is invoked when the user clicks a button, such as a submit order button.

Figure 1:
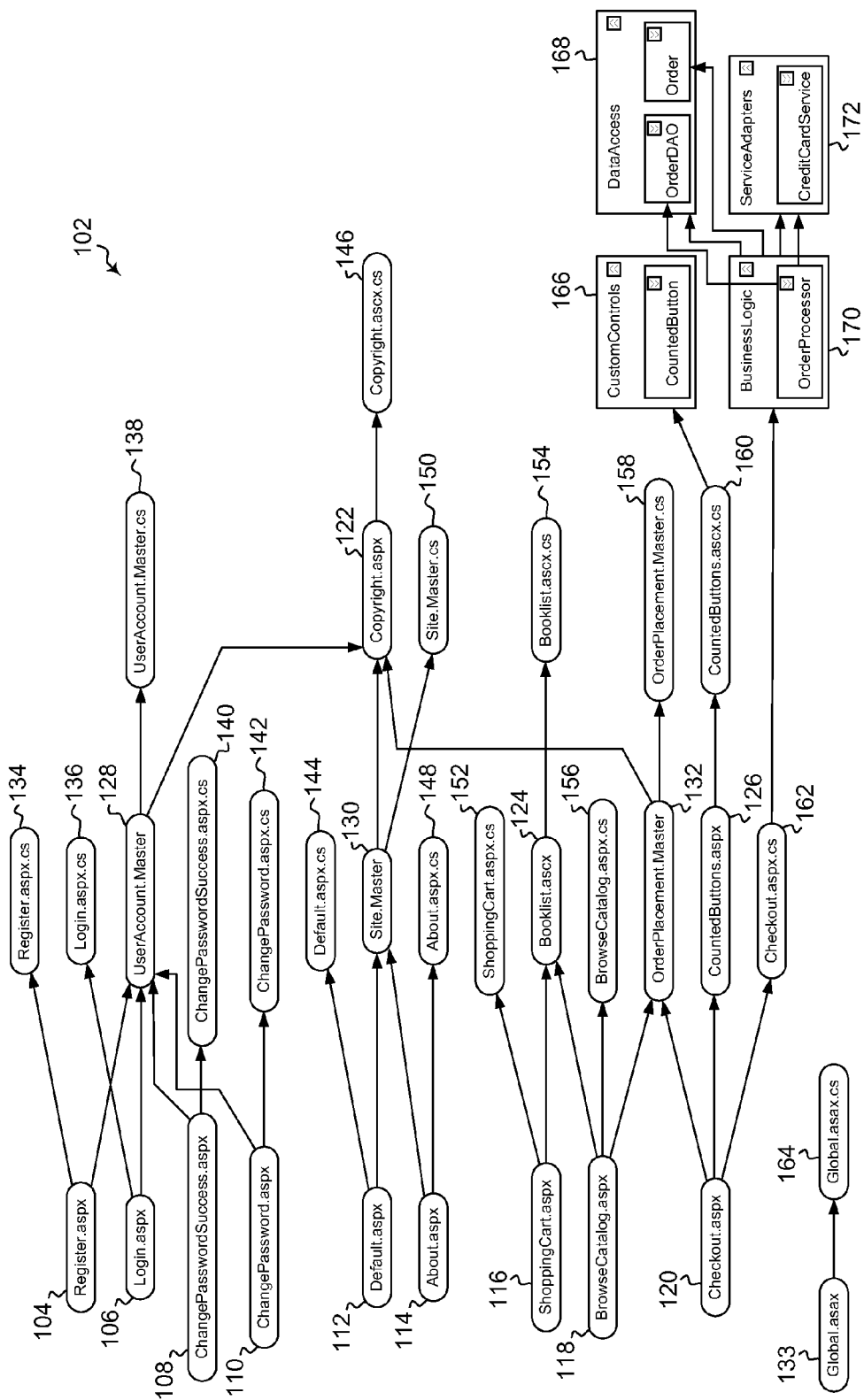
FIG. 1 illustrates a rich site map including nodes representing pages (or views), controls, code, and so forth.

Referring now to FIG. 1, an example is illustrated. FIG. 1 illustrates a site map 102 that may be displayed in a user interface. The site map may be implemented, in one embodiment, using Visual Studio® 2010 available from Microsoft® Corporation of Redmond Wash.

The site map 102 includes a number of different nodes. For example, FIG. 1 illustrates page nodes 104, 106, 108, 110, 112, 114, 116, 118, and 120; user control nodes 122, 124 and 126; master page nodes 128, 130 and 132; content nodes (not shown); global nodes 133, script nodes 134, 136, 138, 140, 142, 144, 146, 148, 150, 152, 154, 156, 158, 160, 162 and 164; server control nodes 166, 168, 170 and 172; etc.

Various types of links can be created between nodes as shown in FIG. 1. For example, links may be created based on: usage of a control, usage of underlying code links, links from web related types and handlers, navigation links, etc.

As noted, one type of link is a usage of a control link (e.g. the link between nodes 130 and 122) which provides a link between control nodes and page nodes to link controls to pages that use the controls. Identification of these links can be done by examining information from pages, master pages, and/or controls themselves. The following illustrates several different examples of how this could be accomplished. Some examples are illustrated using the ASP.NET® framework. In a first example this may be accomplished by examining page registration of tag prefixes and their usage, such as is implemented by the following code:

```
<%@RegisterTagPrefix="aspSample"Namespace="CustomControls"
Assembly="CustomControls"%>
<aspSample:CountedButtonrunat="server"ID="CB1"/>
```

In an alternative example, discovery of links between page nodes and control nodes may be accomplished examining a settings and/or configuration file, such as in the ASP.NET® example, web.config, which is a settings and configuration file. The following illustrates an entry that may be examined from the web.config file to find controls for a page.

```
<pages>
    <controls>
    <addtagPrefix="aspSample"src="~/Controls/DetailsFrom
    Amazon.ascx"tagName="itemDetailsFromAmazon" />
    </controls>
</pages>
```

In the above illustrated example, embodiments may maintain maps of tag prefix registrations. When a usage of a particular tag prefix is detected, it can be used to detect control usage links between various web items. Embodiments can also detect various common errors in control usage such as incorrect paths, etc.

Another type of link is a link to dynamic program code through underlying code links. Underlying code that provides user interface functionality may be based on code and scripts that run on a client browser or code that runs on a server. For example, client side scripts can be downloaded to a client and executed at the client to enable or enhance user interface features. Alternatively, code may be run at a server that enables or enhances user interface features or provides requested functionality from interacting with a user interface.

An example of an underlying code link is illustrated in the link from node 160 to node 166 where node 166 represents a programming object (a Class) named CountedButton in the CustomControls Namespace. For example, ASP.NET® uses a CodeBehind model which places dynamic program code in a separate file or in a specially designated script tag. Thus, in the ASP.NET® example, the underlying code links may be CodeBehind links between web items and the types they implement from the CodeBehind set of attributes.

In alternative embodiments, embodiments may illustrate underlying code links by finding links between controls on a page and their handler methods using event handling attributes. An underlying code link can then be illustrated in the site map 102 from a page node or control node to an underlying code node representing a handler method.

In yet another alternative embodiment, underlying code links may be created by creating types and methods using an ID scheme that maps to other product analyses, e.g.: <assembly_name><type_name><method_name. In some web environments, the only thing that is known ahead of time is that a web element (like a button) may call into a method in a type in some assembly. Embodiments may display such a node as simply a reference to such an assembly, type and method with no other information about the assembly, type or method. For instance, what underlying methods does the original method rely upon? This may not be known, but if the method is adequately described with the <assembly name><type name><method name> scheme, then other systems may be able to use that to provide more information beyond what this invention provides. Thus, embodiments may include links from web related types and handlers to standard product analysis performed by some embodiments. By using the same naming mechanism, embodiments can allow a user to drill into particular types and then get types and methods from other assemblies In yet another alternative embodiment, one embodiment may determine a pages usage of server controls. Links can then be illustrated between pages the server controls.

Yet another type of link that may be illustrated includes navigation links. In some embodiments these links may be identified by examining hrefs. For example, embodiments may parse an href target to calculate the result of a click. A link between pages can then be illustrated in the site map 102 based on the examination.

In alternative embodiments, route tables may be examined to determine where and how navigation links should be illustrated. For example, ASP.Net MVC uses route tables to determine web page navigation. Embodiments may implement functionality to understand the route tables to illustrate links between web items and types in the site map 102. By understanding route tables, embodiments can illustrate navigation flow by illustrating appropriate links in the site map 102. Using routing information to draw navigation links between pages may be advantageous as in many circumstances, this kind of information is not directly discerned from examining web page code.

As illustrated above, some embodiments described herein include the ability to document and graphically illustrate on the site map 102 dependencies between various parts of a website, including dependencies between pages, pages and controls, pages and scripts, pages and services, pages and data access functionality, etc. As illustrated above, some embodiments described herein include the ability to document and graphically illustrate on the site map 102 dependencies to the application code that supports the web functionality. As illustrated above, some embodiments described herein include the ability to document and graphically illustrate on the site map 102 navigational dependencies as well as functional dependencies and view them separately or on the same diagram. As illustrated above, some embodiments described herein include the ability to document and graphically illustrate on the site map 102 views of running applications, business logic, database access methods or functions, services, etc.

Embodiments may also be used to visually ascertain effects of changes on web pages in a website. For example, embodiments may be able to allow a developer to see what effect changing a control will have on a website. Embodiments may be able to allow a developer to see what web pages, will be broken by page modifications. Illustratively, style sheets have style elements. Changing a style element may cause pages to stop functioning. This can be discerned by making the change and observing the effect on the site map 102. Embodiments may allow a developer, with one glance, to tell what action(s) are invoked when the developer modifies something on a page.

Embodiments may organize website maps and application maps according to how pages and screen are organized. For example, some embodiments may show interface organization on a map in a way that mimics how pages and screen are organized.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
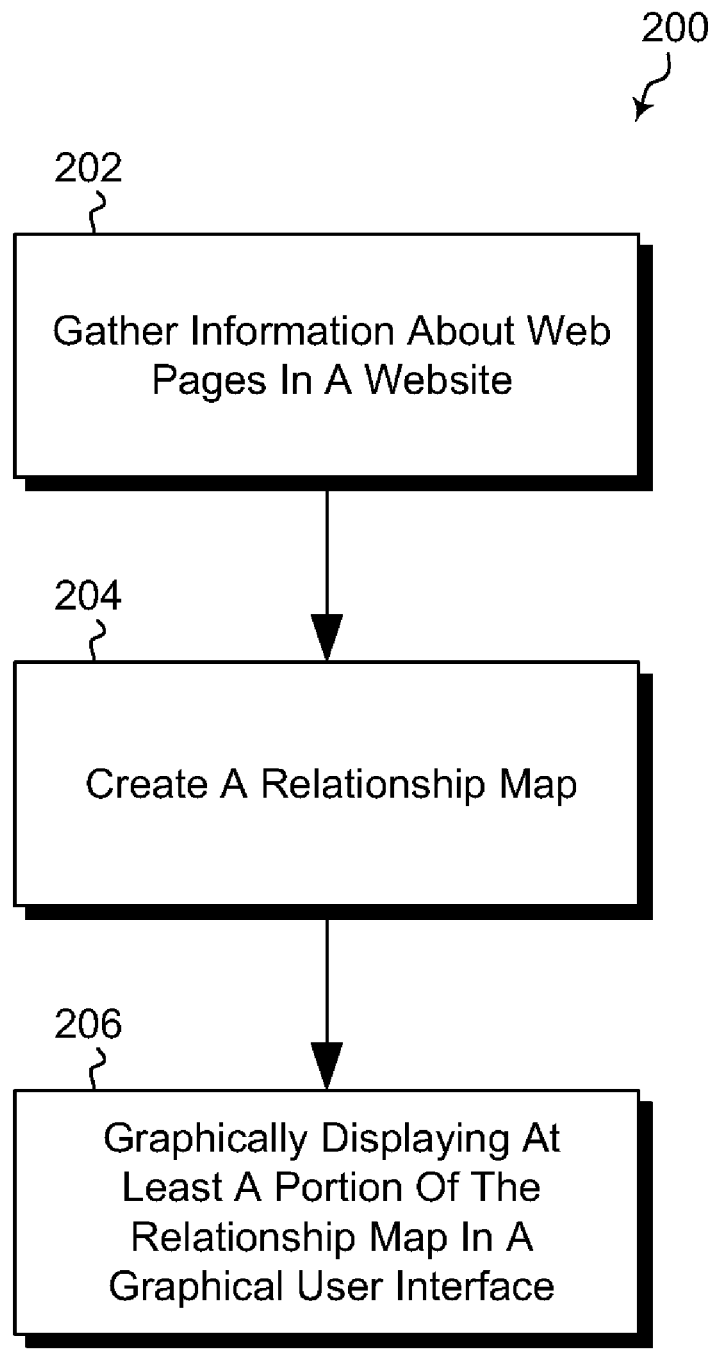
FIG. 2 illustrates a method of providing a website map to a user.

Referring now to FIG. 2, a method 200 is illustrated. The method may be practiced in a computing environment and includes acts for providing a website map to a user. The method 200 may be practiced by a computing system performing various acts of the method.

The method 200 includes gathering information about web pages in a website (act 202). The information gathered includes at least information related to web page relationships, controls, and executable code underlying one or more web pages in the website. For example, information about web page relationships may include information about what web pages can be navigated to from other web pages. Information about controls may include information about controls and interface elements used in web pages for user interaction and website navigation. Information about executable code underlying one or more web pages may include information regarding scripts or business logic code for a site.

The method 200 may be practiced where gathering information about web pages in a website includes obtaining lists from a website development platform used to develop the website. For example, various website development tools may provide information about web page relationships, controls, or other information.

The method 200 may be practiced where gathering information about web pages in a website includes exercising web page controls defined in web pages of the website so as to determine control and code dependencies and web page relationships. For example, embodiment may include functionality for automated interaction with website content. Controls may be automatically interacted with, and the results of such interaction recorded to gather information. In this way, determinations can be made as to what web pages can be navigated between, what controls can be used to navigate the website, what underlying code is executed as a result of interaction with controls, etc.

The method 200 further includes creating a relationship map (act 204). The relationship map includes representations of relationships between the web pages, the controls and the executable code underlying one or more web pages in the website. In some embodiments, the relationship map may further include one or more of representations of relationships between pages and style sheets, representations of relationships between pages and enterprise business logic, representations of relationships between pages and database access methods and/or representations of relationships between pages and services.

Relationship maps may be created and stored in a number of different ways. For example, in some embodiments, the relationship map may be text documents, mark-up language documents, database tables and entries, and the like which correlate web pages with controls and underlying code.

The method 200 may further include graphically displaying at least a portion of the relationship map in a graphical user interface at the computing system (act 206). FIG. 1 illustrates a graphical version of a relationship map that may be displayed to a user in a graphical user interface. For example, some embodiments may be practiced where graphically displaying at least a portion of the relationship map in a graphical user interface at the computing system comprises displaying an image of a page map which shows links between representations of pages in the website and representations of controls and executable code underlying the web pages and relationships between pages and controls and executable code underlying the web pages. FIG. 1 illustrates an example of how nodes representing pages, controls and executable code, and relationships between such could be displayed.

Figure 3B:
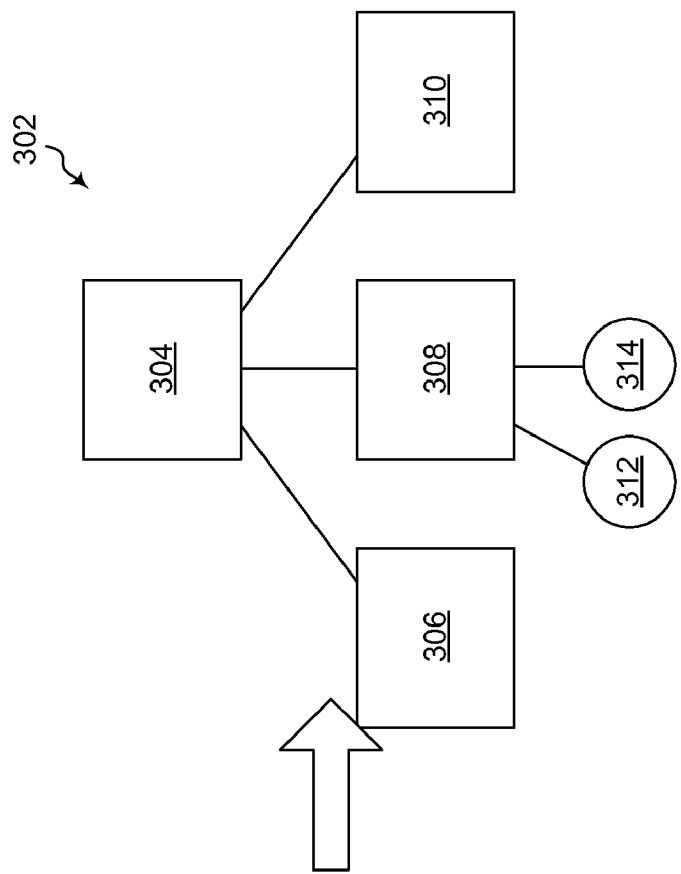
FIG. 3B illustrates a second expanded view of a site or application map.
Figure 3A:
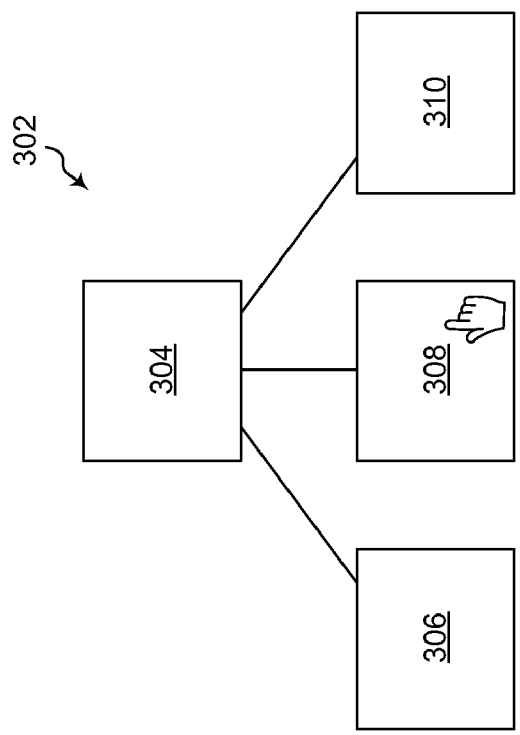
FIG. 3A illustrates a first view of an expandable site or application map.

In an alternative embodiment, the method 200 may be practiced where graphically displaying at least a portion of the relationship map in a graphical user interface includes displaying an image of a page map which shows links between representations of pages in the website while excluding representations of controls and executable code underlying the web pages. User input is received graphically selecting one or more of the representations of pages. The user input graphically selecting one or more of the representations of pages causes control and code dependencies to be displayed for one or more of the pages represented by the representations of pages graphically selected by the user. FIGS. 3A and 3B illustrate an example of this functionality.

In particular, FIG. 3A illustrates a non-expanded view of a site map 302. The site map includes a number of page nodes 304, 306, 308, and 310. The site map shows that a user can navigate from a page represented by node 304 to any one of the pages represented by nodes 306, 308 and 310. However, in its present state, the site map does not show any control nodes, code or scripts nodes, etc. However, a user can select a node. In the present example, a user selects page node 308. As illustrated in FIG. 3B, this causes a number of additional nodes to be displayed including node 312 representing underlying code or scripts, and node 314 representing controls.

Embodiments may facilitate a user being able to determine the effects that occur as a result of changing controls or executable code, etc. for a website. Thus, some embodiments of the method 200 may further include receiving user input updating controls or executable code for the website and as a result updating the website map to reflect the updates to the at least one of controls and executable code.

The embodiments illustrated above have been explained in terms of websites. However, alternative embodiments may be applied to other applications, whether network access based or otherwise. In particular, many applications involve graphical navigation and page-like structures referred to herein as screen. Thus, the site maps shown in FIGS. 1 and 3 may be used to illustrate application maps and the page nodes shown in FIGS. 1 and 3 may alternatively illustrate screens in an application map. Additionally, controls and underlying code may be used to implement these applications in a fashion similar to the website based examples illustrated above. Thus, the control nodes and underlying code nodes illustrated in FIGS. 1 and 3 may be representative of control nodes and underlying code nodes in application maps as well.

Thus, rather than the site maps illustrated herein, embodiments may alternatively implement application maps. Such application maps may include nodes such as screen nodes, user control nodes, content nodes, global nodes, script nodes, application code nodes, sever control nodes, database control nodes, etc. Similarly, links may be established between the different nodes to show navigation links from node to node, control links, underlying code links, etc.

For example, a navigation link may graphically illustrate a link from a screen node to another screen node in the application map. Control links may show a link from a screen node to a control node in the application map. Underlying code links may show links from control nodes or screen nodes to script or application code nodes.

Figure 4:
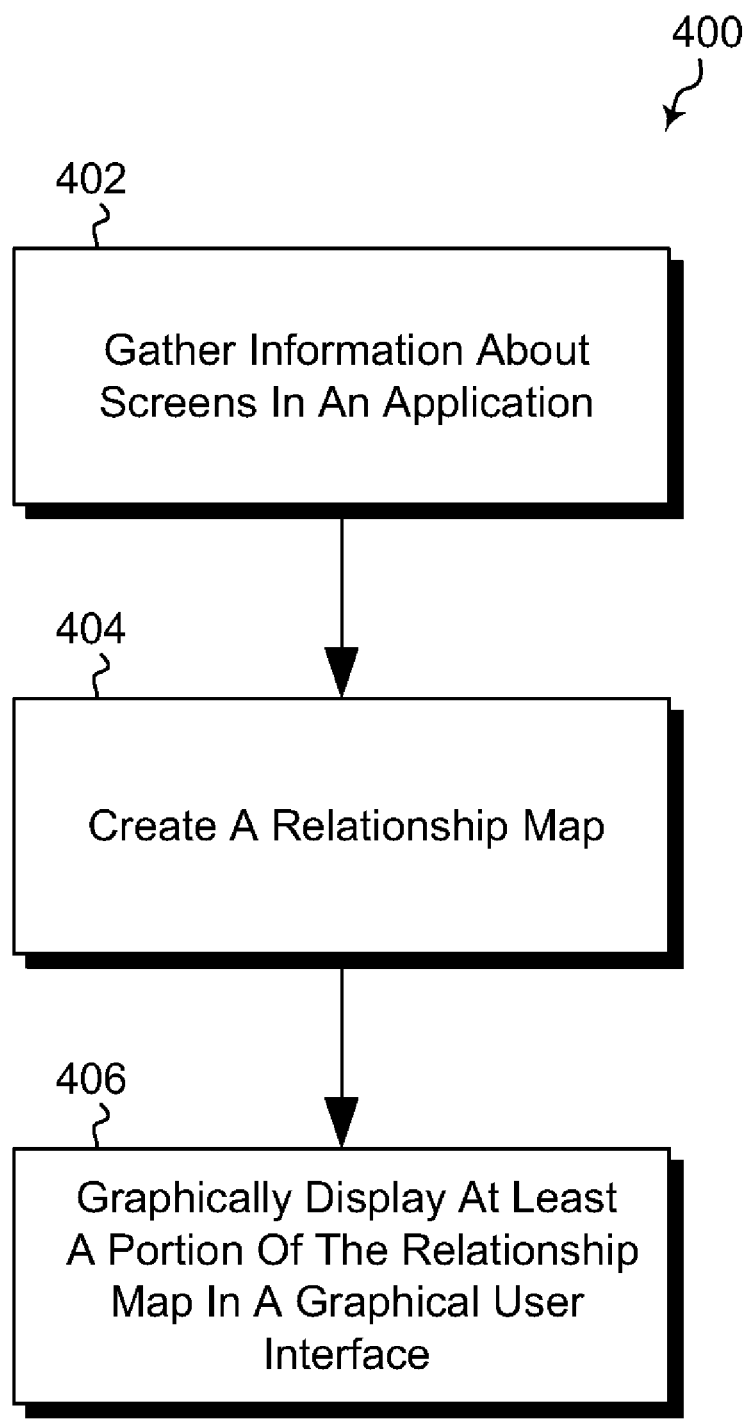
FIG. 4 illustrates a method of providing an application map to a user.

Referring now to FIG. 4, a method 400 is illustrated. The method may be practiced in a computing environment and includes acts for providing an application map to a user. The method 400 may be practiced by a computing system performing various acts of the method.

The method 400 includes gathering information about screens in an application (act 402). The information gathered includes at least information related to screen relationships, controls, and executable code underlying one or more screens in the application. For example, information about screen relationships may include information about what screens can be navigated to from other screens. Information about controls may include information about controls and interface elements used in screens for user interaction and application navigation. Information about executable code underlying one or more screens may include information regarding scripts or business logic code for a site.

The method 400 may be practiced where gathering information about screens in an application includes obtaining lists from an application development platform used to develop the application.

The method 400 may be practiced where gathering information about screens in an application includes executing screen controls defined in screens of the application so as to determine control and code dependencies and screen relationships. For example, embodiment may include functionality for automated interaction with application content. Controls may be automatically interacted with, and the results of such interaction recorded to gather information. In this way, determinations can be made as to what screens can be navigated between, what controls can be used to navigate the application, what underlying code is executed as a result of interaction with controls, etc.

The method 400 further includes creating a relationship map (act 404). The relationship map includes representations of relationships between the screens, the controls and the executable code underlying one or more screens in the application. In some embodiments, the relationship map may further include one or more of representations of relationships between pages and style sheets, representations of relationships between pages and enterprise business logic, representations of relationships between pages and database access methods and/or representations of relationships between pages and services.

Relationship maps may be created and stored in a number of different ways. For example, in some embodiments, the relationship map may be text documents, mark-up language documents, database tables and entries, and the like which correlate screens with controls and underlying code.

The method 400 may further include graphically displaying at least a portion of the relationship map in a graphical user interface at the computing system (act 406). FIG. 1 illustrates a graphical version of a relationship map that may be displayed to a user in a graphical user interface. For example, some embodiments may be practiced where graphically displaying at least a portion of the relationship map in a graphical user interface at the computing system comprises displaying an image of a page map which shows links between representations of pages in the application and representations of controls and executable code underlying the screens and relationships between pages and controls and executable code underlying the screens. FIG. 1 illustrates an example of how nodes representing pages, controls and executable code, and relationships between such could be displayed.

In an alternative embodiment, the method 400 may be practiced where graphically displaying at least a portion of the relationship map in a graphical user interface includes displaying an image of a page map which shows links between representations of pages in the application while excluding representations of controls and executable code underlying the screens. User input is received graphically selecting one or more of the representations of pages. The user input graphically selecting one or more of the representations of pages causes control and code dependencies to be displayed for one or more of the pages represented by the representations of pages graphically selected by the user. FIGS. 3A and 3B illustrate an example of this functionality.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of providing a website map to a user, the method comprising at a computing system:
   gathering information about web pages in a website, including information related to web page relationships, controls, and executable code underlying one or more web pages in the website;
   creating a relationship map, wherein the relationship map includes representations of relationships between the web pages, the controls and the executable code underlying one or more web pages in the website including a first link from a page node representing a web page to a control node representing a control in the page, and a second link from the control node to an underlying business logic code node representing underlying business logic code that is invoked when a user selects the control; and
   graphically displaying at least a portion of the relationship map in a graphical user interface at the computing system, including displaying relationships between web pages, controls in the web pages, and executable code underlying one or more mapped web pages, including displaying one or more links to dynamic program code and including displaying the first link from the page node representing the web page to the control node representing the control in the page, and the second link from the control node to the underlying business logic code node representing underlying business logic code that is invoked when a user selects the control.

2. The method of claim 1, wherein gathering information about web pages in a website includes obtaining lists from a website development platform used to develop the website.

3. The method of claim 1, wherein gathering information about web pages in a website includes exercising web page controls defined in web pages of the website so as to determine control and code dependencies and web page relationships.

4. The method of claim 1, wherein graphically displaying at least a portion of the relationship map in a graphical user interface comprises:
   displaying an image of a page map which shows links between representations of pages in the website while excluding representations of controls and executable code underlying the web pages;
   receiving user input graphically selecting one or more of the representations of pages; and
   whereafter the user input graphically selecting one or more of the representations of pages causes control and code dependencies to be displayed for one or more of the pages represented by the representations of pages graphically selected by the user.

5. The method of claim 1, wherein graphically displaying at least a portion of the relationship map in a graphical user interface at the computing system comprises displaying an image of a page map which shows links between representations of pages in the website and representations of controls and executable code underlying the web pages and relationships between pages and controls and executable code underlying the web pages.

6. The method of claim 1, wherein the relationship map further includes representations of relationships between pages and style sheets.

7. The method of claim 1, wherein the relationship map further includes representations of relationships between pages and enterprise business logic.

8. The method of claim 1, wherein the relationship map further includes representations of relationships between pages and database access methods.

9. The method of claim 1, wherein the relationship map further includes representations of relationships between pages and services.

10. The method of claim 1, further comprising receiving user input updating at least one of controls and executable code for the website and as a result updating the website map to reflect the updates to the at least one of controls or executable code.

11. In a computing environment, a method of providing an application map to a user, the method comprising at a computing system:

gathering information about screens in an application, including information related to screen relationships, controls, and executable code underlying one or more screens in the application;

creating a relationship map, wherein the relationship map includes representations of relationships between the screens, the controls and the executable code underlying one or more screens in the application including a first link from a screen node representing a an application screen to a control node representing a control in the application screen, and a second link from the control node to an underlying business logic code node representing underlying business logic code that is invoked when a user selects the control; and graphically displaying at least a portion of the relationship map in a graphical user interface at the computing system, including displaying relationships between screens, controls in the screens, and executable code underlying one or more mapped screens, including displaying one or more links to dynamic programming code and including displaying the first link from the screen node representing the application screen to the control node representing the control in the application screen, and the second link from the control node to the underlying business logic code node representing underlying business logic code that is invoked when a user selects the control.

12. The method of claim 11, wherein gathering information about screens in an application includes obtaining lists from an application development platform used to develop the application.

13. The method of claim 11, wherein gathering information about screens in an application includes executing screen controls defined in screens of the application so as to determine control and code dependencies and screen relationships.

14. The method of claim 11, wherein graphically displaying at least a portion of the relationship map in a graphical user interface comprises:

displaying an image of a screen map which shows links between representations of screens in the application while excluding representations of controls and executable code underlying the screens;

receiving user input graphically selecting one or more of the representations of screens; and whereafter the user input graphically selecting one or more of the representations of screens causes control and code dependencies to be displayed for one or more of the screens represented by the representations of screens graphically selected by the user.

15. The method of claim 11, wherein graphically displaying at least a portion of the relationship map in a graphical user interface at the computing system comprises displaying an image of a screen map which shows links between representations of screens in the application and representations of controls and executable code underlying the screens and relationships between screens and controls and executable code underlying the screens.

16. The method of claim 11, wherein the relationship map further includes representations of relationships between screens and style sheets.

17. The method of claim 11, wherein the relationship map further includes representations of relationships between screens and enterprise business logic.

18. The method of claim 11, wherein the relationship map further includes representations of relationships between screens and database access methods.

19. The method of claim 11, wherein the relationship map further includes representations of relationships between screens and services.

20. In a computing environment, a method of providing a website map to a user, the method comprising at a computing system:

displaying an image of a page map which shows links between representations of web pages in a website while excluding representations of controls and executable code underlying the web pages;

receiving user input graphically selecting one or more of the representations of web pages; and whereafter the user input graphically selecting one or more of the representations of pages causes control and code dependencies for controls implemented in the pages and code dependencies for code for the pages, including code dependencies to dynamic programming code and including displaying a first link from a page node representing a web page to a control node representing a control in the page, and a second link from a control node to an underlying business logic code node representing underlying business logic code that is invoked when a user selects the control, to be displayed for one or more of the pages represented by the representations of pages graphically selected by the user.

* * * * *